May 27, 1969

T. R. STOCKTON 3,446,089

COMPOSITE RING GEAR DRIVING MEMBER

Filed Nov. 24, 1967

THOMAS R. STOCKTON
INVENTOR

BY John R. Faulkner
Robert E. McCollum
ATTORNEYS

United States Patent Office 3,446,089
Patented May 27, 1969

3,446,089
COMPOSITE RING GEAR DRIVING MEMBER
Thomas R. Stockton, Ann Arbor, Mich., assignor to Ford Motor Company, Dearborn, Mich., a corporation of Delaware
Filed Nov. 24, 1967, Ser. No. 685,564
Int. Cl. F16h 55/12
U.S. Cl. 74—448                    7 Claims

ABSTRACT OF THE DISCLOSURE

A disc-type rotary heat exchanger is dirven frictionally by a composite ring gear comprising a number of circumferentially overlapping gear tooth-like segments that each frictionally engage the heat exchanger periphery and are interconnected by oppositely directed end springable flanges, the segments being preloaded against the matrix during assembly of the ring gear around the matrix to provide sufficient frictional force to cause a unitary movement of the ring gear and matrix.

---

Figure 1:
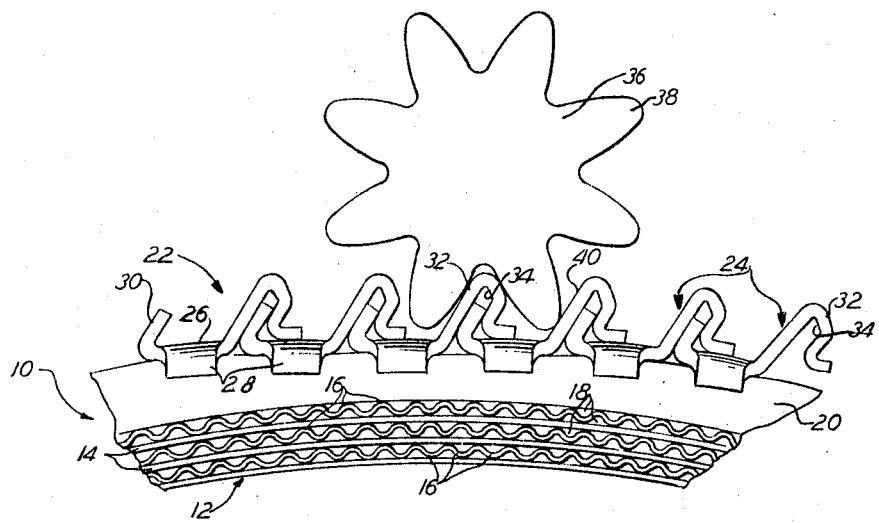

This invention relates, in general, to a drive mechanism for a rotary member. More particularly, it relates to a driving mechanism for a rotary heat exchanger or regenerator of the disc type that is commonly used in gas turbine engines installed in motor vehicles.

The recent development of ceramic rotary regenerators has pointed out a need for the redesign of the drive assembly for rotating the regenerator matrix, due to the brittle characteristics of ceramic. Metallic rotary heat exchangers generally are driven by a one piece metallic ring gear or similar device such as a chain fixed to the outer periphery of the disc-like regenerator matrix. This same drive, however, is not necessarily practical for a ceramic regenerator. Ceramic has a low rate of thermal expansion as compared to metal. Therefore, the differential expansion is large between a metal driving member fixed rigidly on a thick cast ceramic rim, for example. Unfavorable stresses can develop that can crack the ceramic rim and cause failure of the regenerator.

The invention eliminates the above disadvantages by providing a metallic regenerator drive member that is circumferentially and radially expandable, and frictionally engages the periphery of the regenerator rim, and accommodates the dimensional variations arising from the thermal differential expansion between a ceramic regenerator and the metallic drive member.

More particularly, the invention consists of a composite metallic ring gear consisting of a plurality of interlocking tooth-like segments formed from spring stock, with involute profiles to the driven surface. The spring rate of the matrix permits both circumferential and radial expansion without inducing cracking stresses to the ceramic regenerator, and the ring gear segments are preloaded in tension during assembly of the chain around the regenerator in a manner to frictionally engage the regenerator surface with sufficient force to provide a unitary movement of both the gear and the regenerator.

It is an object of the invention, therefore, to provide a peripheral friction drive of a rotary member.

It is also an object of the invention to provide a drive assembly for a rotary disc-type heat exchanger that consists of an annular segmented gear drive member that frictionally engages the rotary regenerator rim.

It is a still further object of the invention to provide a drive of the type described above in which the gear segments are essentially S-shaped spring portions that overlap and are interlocked with one another to frictionally bear against the outer periphery of the regenerator rim; and, are prestressed by circumferential expansion during assembly of the ring gear around the regenerator to frictionally bear against the regenerator with a force sufficient to provide a unitary movement of the driving member and the regenerator.

Figure 2:
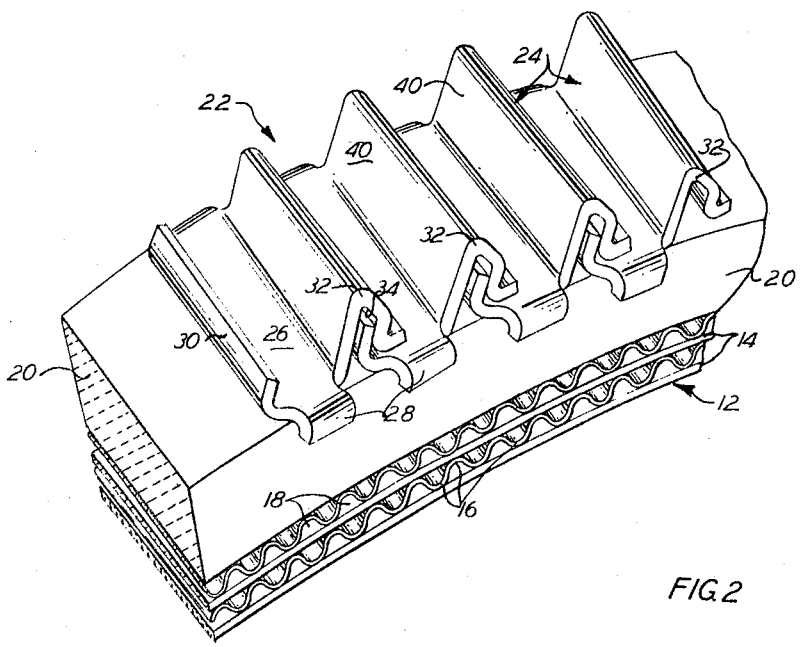

Other objects, features and advantages of the invention will become more apparent upon reference to the succeeding detailed description thereof, and to the drawings illustrating the preferred embodiments thereof, wherein:

FIG. 1 is a side elevational view of a portion of a rotary regenerator and the drive mechanism embodying the invention; and FIGURE 2 is a perspective view of the FIGURE 1 showing.

FIGURE 1 shows a portion 10 of a rotary heat exchanger of the disc type commonly used in regenerative-type gas turbine engines installed in motor vehicles. The regenerator usually would be positioned between the compressor and combustion sections of the engine to preheat the compressor discharge air by the turbine exhaust gases prior to the air entering the combustion chamber, for better fuel economy.

By way of background, a regenerator such as that shown partially in FIGURES 1 and 2, generally is constructed to rotate, say, about a stationary shaft. The matrix 12 of the regenerator generally would be made up of a number of narrow bands of thin flat ceramic strips 14, separated by an equal width corrugated ceramic strip 16. The strips together form axial flow passages 18 for the passage therethrough of either the hot, low pressure, turbine exhaust gases, or the low temperature, high pressure, compressor discharge air. A thick cast ceramic outer rim 20 surrounds and encloses matrix 12.

The regenerator would be mounted with suitable stationary seals and ducting, not shown, so as to effectively divide the regenerator wheel into two halves, or upper and lower chamber portions. The hot turbine exhaust gases, for example, would flow in one direction through the upper half portion of the axial flow passages as the regenerator rotates, the passage walls absorbing the heat. As the regenerator wheel rotates through the bottom half cycle, the high pressure, low temperature compressor discharge air would pass in the opposite direction through the same axial flow passages, in a known manner to permit the air to absorb the heat from the now warmed passage walls. Thus, the overall effect is that the turbine hot gases give up a portion of their waste heat to the lower temperature compressor discharge air as the regenerator wheel rotates through its entire cycle.

Surrounding and frictionally engaging rim 20 is the annular segmented, regenerator driving element 22 embodying the invention. Element 22 is a composite metallic ring gear that consists of a plurality of essentially S-shaped segments 24 that are circumferentially locked and axially located in a manner to be described to permit both radial and circumferential expansion of the ring gear as a whole.

More specifically, each segment 24 has an essentially flat base portion 26 with lateral edge flanges 28. The base portion 26 frictionally engages the peripheral surface of regenerator rim 20, the laterally projecting edge flanges 28 being bent over to clamp each segment against the side faces of rim 20 and thereby axially locate the segments.

The circumferential spaced end portions of each segment 24 are formed with radially projecting flanges 30 and 32. Flagne 32 is reversly bent to form a groove 34 that receives the end flange 30 of the next adjacent segment upon assembly, as shown in FIGURE 2. Each of the segments 24 is made of spring stock so that flanges 30 and 32 can deflect or bend under a tension load.

The circumferential length of each segment in its unstressed or free state, when assembled in an overlapping manner with the other segments to form the composite ring gear, would have a diameter less than the diameter of rim 20. This assures a frictional preload of the ring gear against the regenerator rim upon assembly to insure unitary movement of the ring gear and regenerator.

FIGURE 1 shows a driving pinion 36 having tooth segments 38 that are engageable with the inclined surface 40 of each ring gear segment 24. In this case, surface 40 has an involute profile.

In operation, upon rotation of drive pinion 36, a force will be exerted against the involute profile surface of the segment 24 in contact with the gear tooth 38, causing a tension force to be exerted on the ring gear as a whole. While a small portion of the ring gear directly ahead of the segment that is in contact with drive pinion tooth 38 would tend to move rapidly away from rim 20, the majority of the remaining ring gear segments would be in tension and would attempt to contract the gear about the regenerator rim. This provides a self-energizing action in so far as the frictional force engaging rim 20 is concerned. Thus, upon drive by pinion 36, the ring gear tends to engage the regenerator rim with an increasing frictional force.

From the foregoing, therefore, it will be seen that the invention provides a composite ring gear consisting of a number of interlocking tooth segments that are formed from spring stock with an involute profile on the loaded face side, and that the bent configuration of each tooth contributes to a low rate spring characteristic for the full complement of the segments. It will also be seen that the spring rate of the segment accommodates dimensional variations arising from the large differences in thermal expansion between the ceramic regenerator and the metallic gear and also the loose manufacturing tolerances. It will of course be understood that the correct number of segments would be selected in consideration of the measured random circumference of the regenerator rim and the accumulated variations in the assembled gear length.

While the invention has been described and illustrated in its preferred embodiment, it will be clear to those skilled in the arts to which it pertains that many changes and modifications may be made thereto without departing from the scope of the invention.

I claim:

1. A peripheral drive mechanism for a cylindrical rotatable member including a composite ring-like gear member comprising a plurality of circumferentially springable elements extending circumferentially around portions of said member, means on said elements frictionally engaging the periphery of said member, flexible means on adjacent circumferential parts of said elements interconnecting said elements, and drive means engageable with and rotating said elements for a frictional drive of said member.

2. A drive mechanism as in claim 1, said elements each comprising a gear tooth segment, said drive means having a tooth portion thereon engageable successively with individual ones of said tooth segments.

3. A drive mechanism as in claim 1, said elements each having a surface inclined in a circumferential direction and comprising a gear tooth segment bearing surface, said drive means having a gear tooth engageable successively with individual ones of said tooth segment surfaces.

4. A drive mechanism as in claim 1, said flexible means comprising interlocking springable flanges on circumferentially contiguous edge portions of adjacent elements.

5. A drive mechanism as in claim 4, said elements each having an essentially flat base portion frictionally engaging the periphery of said member, and radially depending end portions on said base portion extending over the edges of and frictionally engaging side portions of said member.

6. A drive mechanism as in claim 4, said segments together in an unstressed state having an internal diameter less than the outer diameter of said regenerator whereby a tension load is imposed circumferentially upon said segments upon assembly thereof around said regenerator thereby circumferentially springing said flanges.

7. A peripheral drive mechanism for a rotary regenerator comprising a rotatable gear having teeth thereon engaging the gear tooth segments of a composite ring gear member circumferentially surrounding and frictionally engaging the periphery of said regenerator, said segments each comprising an essentially S-shaped element having springable curved circumferential end portions interconnected by an essentially flat base portion frictionally engaging the periphery of said regenerator, the circumferentially adjacent end portions of each pair of segments being interlocked for transmission of drive between said segments from said gear, a portion of the surface of each segment constituting a gear tooth profile engageable by a tooth of said gear for circumferentially moving said segment.

References Cited

UNITED STATES PATENTS

| 1,648,550 | 11/1927 | Kantor | 74—448 |
| 2,572,334 | 10/1951 | Guibert | 74—461 |
| 3,311,204 | 3/1967 | Barnard | 74—446 X |
| 3,363,478 | 1/1968 | Lanning | 74—446 |

LEONARD H. GERIN, *Primary Examiner.*

U.S. Cl. X.R.

29—159.2, 525; 74—243, 449, 462; 165—8